United States Patent
Takeda et al.

(10) Patent No.: US 11,011,738 B2
(45) Date of Patent: May 18, 2021

(54) METHOD FOR PRODUCING NEGATIVE ELECTRODE AND SECONDARY BATTERY, AND SECONDARY BATTERY

(71) Applicant: TOYOTA JIDOSHA KABUSHIKI KAISHA, Toyota (JP)

(72) Inventors: Kazuhisa Takeda, Toyota (JP); Yuji Yokoyama, Nagoya (JP); Keisuke Ohara, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/782,466

(22) Filed: Oct. 12, 2017

(65) Prior Publication Data
US 2018/0108903 A1    Apr. 19, 2018

(30) Foreign Application Priority Data

Oct. 19, 2016   (JP) .............................. JP2016-205435
Jun. 2, 2017    (JP) .............................. JP2017-110253

(51) Int. Cl.
*H01M 4/04*      (2006.01)
*H01M 8/10*      (2016.01)
(Continued)

(52) U.S. Cl.
CPC .......... *H01M 4/0404* (2013.01); *H01M 4/02* (2013.01); *H01M 4/043* (2013.01);
(Continued)

(58) Field of Classification Search
None
See application file for complete search history.

(56) References Cited

U.S. PATENT DOCUMENTS

| 5,766,789 A * | 6/1998 | James ...................... H01G 4/08 |
| | | 204/431 |
| 2002/0006552 A1 | 1/2002 | Ishida et al. |

(Continued)

FOREIGN PATENT DOCUMENTS

| EP | 2 793 300 A1 | 10/2014 | |
| EP | 2793300 | * 10/2014 | .............. H01M 4/04 |

(Continued)

OTHER PUBLICATIONS

Juhyun Song and Martin Z. Bazant, Effects of nanoparticle geometry and size distribution on diffusion impedance of battery electrodes, 2013, Journal of the Electrochemical Society, 160(1), p. A15-A24. (Year: 2013).*

(Continued)

*Primary Examiner* — Jonathan Crepeau
*Assistant Examiner* — Angela J Martin
(74) *Attorney, Agent, or Firm* — Oliff PLC

(57) ABSTRACT

Provided is a method for producing a negative electrode by using a negative electrode active material and ceramic particles, the method ensuring satisfactory coatability of the paste and high peel strength and hardness of the obtained negative electrode active material layer. The method for producing a negative electrode disclosed herein includes a step of coating a negative electrode paste including a negative electrode active material and ceramic particles on a negative electrode current collector; a step of drying the coated negative electrode paste to form a negative electrode active material layer; and a step of pressing the negative electrode active material layer. The ceramic particles have an aspect ratio of 1.5 or more and 20 or less. The ceramic particles have a short side length of ⅕ or less of an average particle diameter of the negative electrode active material. In the negative electrode paste, the ceramic particles are con- (Continued)

tained in an amount of 3% by mass to 20% by mass based on a total solid content of the negative electrode paste.

11 Claims, 4 Drawing Sheets

(51) Int. Cl.
    *H01M 4/62*     (2006.01)
    *H01M 4/02*     (2006.01)

(52) U.S. Cl.
    CPC .......... *H01M 4/0435* (2013.01); *H01M 4/62* (2013.01); *H01M 8/10* (2013.01)

(56) References Cited

U.S. PATENT DOCUMENTS

| | | | |
|---|---|---|---|
| 2008/0299436 A1* | 12/2008 | Striker | H01M 8/1246 429/486 |
| 2015/0017525 A1 | 1/2015 | Lee et al. | |
| 2018/0123123 A1 | 5/2018 | Azami | |

FOREIGN PATENT DOCUMENTS

| | | | | |
|---|---|---|---|---|
| JP | H10-255807 | A | | 9/1998 |
| JP | 2011-060558 | A | | 3/2011 |
| JP | 2016-126900 | A | | 7/2016 |
| JP | 2016126900 | | * | 7/2016 ............. H01G 11/86 |
| JP | 2017-174664 | A | | 9/2017 |
| KR | 10-2015-0009115 | A | | 1/2015 |
| KR | 1020150009115 | | * | 9/2015 ............. H01M 4/587 |
| WO | 2011/094295 | A1 | | 8/2011 |
| WO | WO 2011094295 | | * | 8/2011 ............. H01M 4/88 |
| WO | 2016/031220 | A1 | | 3/2016 |
| WO | WO 2016/031220 | | * | 3/2016 ............. H01M 4/04 |
| WO | 2016-152861 | A1 | | 9/2016 |

OTHER PUBLICATIONS

Liu, Jinping, et al. "Direct growth of SnO2 nanorod array electrodes for lithium-ion batteries". Journal of Materials Chemistry, vol. 19, No. 13, pp. 1859-1864, 2009.

Favors, Zachary, et al. "Stable Cycling of SiO2 Nanotubes as High-Performance Anodes for Lithium-Ion Batteries". Scientific Reports, vol. 4, No. 1, 2014.

Song, Juhyun, et al. "Effects of Nanoparticle Geometry and Size Distribution on Diffusion Impedance of Battery Electrodes". Journal of the Electrochemical Society, vol. 160, No. 1, pp. A15-A24, 2011.

* cited by examiner

METHOD FOR PRODUCING NEGATIVE ELECTRODE AND SECONDARY BATTERY, AND SECONDARY BATTERY

BACKGROUND OF THE INVENTION

1. Field of the Invention

The present teaching relates to a method for producing a negative electrode and a secondary battery. The present teaching also relates to a secondary battery. This application claims priority based on Japanese Patent Application No. 2016-205435 filed on Oct. 19, 2016 and Japanese Patent Application No. 2017-110253 filed on Jun. 2, 2017, the entire contents of which are hereby incorporated by reference.

2. Description of the Invention

Since nonaqueous electrolyte secondary batteries such as lithium ion secondary batteries (lithium secondary batteries) are lighter in weight and higher in energy density than existing batteries, the nonaqueous electrolyte secondary batteries have recently been put to use as the so-called portable power supplies for personal computers, portable terminals, etc. and also as drive power supplies for vehicles. In particular, lithium ion secondary batteries that are lightweight and can produce a high energy density are expected to be more and more popular as high-output power supplies for driving vehicles such as electric vehicles (EV), hybrid vehicles (HV), and plug-in hybrid vehicles (PHV).

A negative electrode for use in a lithium ion secondary battery typically has a configuration in which a negative electrode active material layer is provided on a negative electrode current collector. The negative electrode active material layer typically includes a negative electrode active material such as a carbon material. The negative electrode active material is a substance capable of reversibly occluding and releasing lithium ions as charge carriers. A negative electrode used in a lithium ion secondary battery is typically produced by coating a mixed paste containing a negative electrode active material on one side or both sides of a negative electrode current collector, drying, and then pressing (rolling). Such a production method enables high-density filling and arrangement of the negative electrode active material.

However, gaps are present between particles of the negative electrode active material. Accordingly, Japanese Patent Application Publication No. H10-255807 suggests to mix ceramic particles in a paste for preparing a negative electrode active material layer and to arrange ceramic particles in gaps present in the negative electrode active material layer. Japanese Patent Application Publication No. H10-255807 indicates that this improves the mechanical strength of the negative electrode and improves the cycle characteristic.

SUMMARY OF THE INVENTION

However, the research conducted by the inventors of the present teaching has demonstrated that there is room for improvement in coatability of the paste and peel strength and hardness of the negative electrode active material layer when producing a negative electrode by using a negative electrode active material and ceramic particles.

Accordingly, an object of the present teaching is to provide a method for producing a negative electrode by using a negative electrode active material and ceramic particles, the method ensuring satisfactory coatability of the paste and high peel strength and hardness of the obtained negative electrode active material layer.

The method for producing a negative electrode disclosed herein includes a step of coating a negative electrode paste including a negative electrode active material and ceramic particles on a negative electrode current collector; a step of drying the coated negative electrode paste to form a negative electrode active material layer, and a step of pressing the negative electrode active material layer. The ceramic particles have an aspect ratio of 1.5 or more and 20 or less. The ceramic particles have a short side length of $1/5$ or less of an average particle diameter of the negative electrode active material. In the negative electrode paste, the ceramic particles are contained in an amount of 3% by mass to 20% by mass based on a total solid content of the negative electrode paste.

With such a configuration, satisfactory paste coatability is obtained without excessively increasing the viscosity of the negative electrode paste. In addition, it is possible to increase the peel strength and hardness (for example, a spring constant) of the negative electrode active material layer. Thus, with such a configuration, it is possible to provide a method for producing a negative electrode that ensures satisfactory coatability of the paste and high peel strength and hardness of the obtained negative electrode active material layer.

The method for producing a secondary battery disclosed herein includes a step of preparing a negative electrode by the above-described method for producing a negative electrode; a step of laminating the obtained negative electrode together with a positive electrode and a separator to prepare an electrode assembly; and a step of preparing a secondary battery by using the electrode assembly.

With such a configuration, since the paste coatability of the negative electrode is satisfactory and the peel strength and hardness of the negative electrode active material layer are high, the secondary battery can be produced with a satisfactory material yield.

The secondary battery disclosed herein includes an electrode assembly in which a positive electrode and a negative electrode are laminated with a separator being interposed therebetween, and a nonaqueous electrolyte. The negative electrode includes a negative electrode active material layer, and the negative electrode active material layer includes a negative electrode active material and ceramic particles. The ceramic particles have an aspect ratio of 1.5 or more and 20 or less. The ceramic particles have a short side length of $1/5$ or less of the average particle diameter of the negative electrode active material. The ceramic particles are contained in an amount of 3% by mass to 20% by mass in the negative electrode active material layer.

With such a configuration, since the paste coatability of the negative electrode is satisfactory and the peel strength and hardness of the negative electrode active material layer are high at the time of producing the negative electrode, the secondary battery can be produced with a satisfactory material yield.

In a desired embodiment of the secondary battery disclosed herein, the spring constant of the negative electrode is higher than the spring constant of the separator. With such a configuration, it is possible to suppress excessive outflow of the nonaqueous electrolyte from the negative electrode active material layer in repeated charging and discharging. Therefore, excessive outflow of the nonaqueous electrolyte from the electrode assembly can be suppressed. As a result, the increase in resistance of the secondary battery at the time of repeated high-rate charging and discharging can be suppressed.

In a desired embodiment of the secondary battery disclosed herein, the ceramic particles have a plate shape having corners. With such a configuration, since the corners of the ceramic particles bite into the negative electrode active material, it is possible to improve effectively the peel strength and hardness of the negative electrode active material layer. As a result, it is possible to provide a secondary battery that can be produced with a particularly satisfactory material yield.

DESCRIPTION OF THE PREFERRED EMBODIMENT

Figure 1:
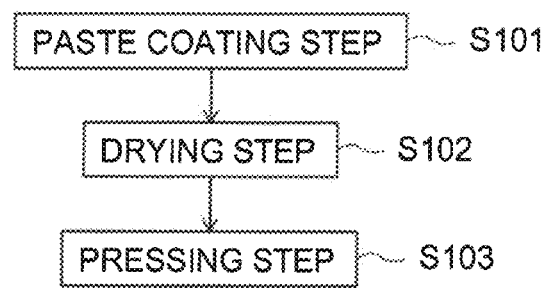
FIG. 1 is a flowchart showing each step of a method for producing a negative electrode according to an embodiment of the present teaching.

An embodiment of the present teaching will be described hereinbelow with reference to the drawings. Further, matters other than those particularly mentioned in the present specification, and necessary for the implementation of the present teaching (for example, the general configuration and production process of a negative electrode and a secondary battery not characterizing the present teaching) can be grasped as design matters by a person skilled in the art based on the related art in the pertinent field. The present teaching can be carried out based on the contents disclosed in the present specification and common technical sense in the pertinent field. In addition, the dimensional relationship (length, width, thickness, etc.) in the drawings does not reflect the actual dimensional relationship.

In the present specification, the term "secondary battery" refers to a power storage device that can be repeatedly charged and discharged. This term is inclusive of the so-called storage battery such as a lithium ion secondary battery and a power storage element such as an electric double layer capacitor. Further, in the present specification, the term "lithium ion secondary battery" refers to a secondary battery that uses lithium ions as a charge carrier and realizes charging and discharging by charge transfer by lithium ions between positive and negative electrodes.

The present teaching will be described hereinbelow in detail with reference to an embodiment thereof, but the present teaching is not intended to be limited to this embodiment.

FIG. 1 shows each step of the method for producing a negative electrode according to the present embodiment. The method for producing a negative electrode according to the present embodiment includes a step (paste coating step) S101 of coating a negative electrode paste including a negative electrode active material and ceramic particles on a negative electrode current collector, a step (drying step) S102 of drying the coated negative electrode paste to form a negative electrode active material layer, and a step (pressing step) S103 of pressing the negative electrode active material layer. In the method for producing a negative electrode according to the present embodiment, the aspect ratio of the ceramic particles is 1.5 or more and 20 or less. The short side length of the ceramic particles is ⅕ or less of the average particle diameter of the negative electrode active material. Further, in the negative electrode paste, the ceramic particles are contained in an amount of 3% by mass to 20% by mass based on the total solid content of the negative electrode paste.

First, the paste coating step S101 will be described. The paste coating step S101 can be implemented, for example, as follows. First, a paste including a negative electrode active material and ceramic particles is prepared. In the present specification, the "paste" refers to a mixture in which a part or all of the solid content is dispersed in a solvent, and is inclusive of the so-called "slurry", "ink", and the like.

As the negative electrode active material, those used in conventional secondary batteries can be used without particular limitation. For example, carbon materials having a graphite structure at least in part thereof can be used, and among them, a carbon material such as graphite, hard carbon, soft carbon and the like can be advantageously used. The surface of the carbon material may be coated with an amorphous carbon film.

The average particle diameter of the negative electrode active material is not particularly limited and may be about the same as that in the conventional secondary battery. The average particle diameter of the negative electrode active material is, for example, 50 µm or less, typically 20 µm or less, desirably 1 µm to 20 µm, and more desirably 5 µm to 15 µm.

Unless otherwise specified, the "average particle diameter" in the present specification refers to a particle diameter (D50) at which the cumulative frequency is 50% by volume percentage in the particle size distribution measured by a laser diffraction scattering method.

As the ceramic particles, those which do not participate in the charge-discharge reaction are desirable, and examples thereof include alumina, boehmite, aluminum hydroxide, zirconia, silicon oxide, magnesium oxide, sodium oxide, and the like. These can be used singly or in combination of two or more thereof. Since the ceramic particles are usually much harder than the negative electrode active material particles which are a carbon material, the mechanical strength, for example, the hardness of the negative electrode active material layer can be increased. As a result, in the secondary battery using the negative electrode obtained by the production method of the present embodiment, since the compressive deformation of the negative electrode active material layer is suppressed, the secondary battery has excellent cycle characteristic (in particular, a high-rate cycle characteristic).

Regarding the shape of the ceramic particles, the aspect ratio of the ceramic particles is in the range of 1.5 or more and 20 or less. Where the aspect ratio is less than 1.5, the shape of the ceramic particles becomes close to a spherical shape, the specific surface area becomes large, the amount of the solvent (especially water) contained in the below-described paste which is absorbed by the ceramic particles increases, and the paste viscosity increases. As a result, the coatability is deteriorated. Meanwhile, when the aspect ratio exceeds 20, the volume of the portion of the ceramic particle not participating in the increase in spring constant (increase in hardness) of the negative electrode active material layer becomes large. As a result, the spring constant increasing effect corresponding to the addition amount of the ceramic particles cannot be obtained, and the characteristics of the negative electrode active material layer may be impaired.

The aspect ratio can be determined using, for example, an electron microscope. Specifically, the aspect ratio can be determined by observing ceramic particles contained in the negative electrode paste or the negative electrode active material layer with a scanning electron microscope (SEM), determining a long side length (long diameter) $L1$ and a short side length (short diameter) $L2$ of the observed ceramic particles, and dividing the long side length $L1$ by the short side length $L2$. When determining the aspect ratio by SEM observation, measurement is performed on 50 or more particles, and the average value is determined.

The short side length ($L2$) of the ceramic particle is $\frac{1}{5}$ or less of the average particle diameter of the negative electrode active material. When the short side length of the ceramic particles is larger than $\frac{1}{5}$ of the average particle diameter of the negative electrode active material, the ceramic particles are likely to move when the pressing treatment is performed in the below-described pressing step S103. As a result, the peel strength of the negative electrode material layer is lowered. Therefore, problems such as peeling of the negative electrode active material layer and the like may occur during the production process. Alternatively, the hardness of the negative electrode active material layer is lowered.

The short side length of the ceramic particles can be determined using an electron microscope. When determining the short side length by SEM observation, measurement is performed on 50 or more particles, and the average value is determined.

The shape of the ceramic particles is not particularly limited as long as the relationship between the aspect ratio and the short side length is satisfied. The ceramic particles may have, for example, a plate shape, a rod shape and the like, desirably a plate shape having corners (for example, a rectangular plate shape, a disc shape, and the like). When the shape of the ceramic particles is a plate shape having corners, the corners of the ceramic particles bite into the negative electrode active material. Therefore, when the pressing treatment is performed in the pressing step S103 as described hereinbelow, ceramic particles are less likely to move.

When the ceramic particles have a plate shape, a middle side length (middle diameter) $L3$ is desirably 0.5 times or more and 1 time or less, more desirably 0.7 times or more and 1 time or less, the $L1$. Further, when the ceramic particles have a plate shape, the short side length $L2$ is the thickness of the plate-shaped particle, the long side length $L1$ is the long side length (long diameter) of the plane of the plate-shaped particle, and the middle side length $L3$ is the short side length (short diameter) of the plane of the plate-shaped particle. The middle side length $L3$ of the ceramic particle can be measured in the same manner as the short side length $L2$ of the ceramic particle.

Further, the negative electrode paste includes a solvent. An aqueous solvent is desirably used as the solvent. The aqueous solvent refers to water or a mixed solvent mainly including water. As a solvent other than water constituting the mixed solvent, an organic solvent (for example, a lower alcohol, a lower ketone, and the like) that can be uniformly mixed with water can be used. The aqueous solvent desirably includes water at 80% by mass or more, more desirably 90% by mass or more, and still more desirably 95% by mass or more. Most desirably, the aqueous solvent is water.

The negative electrode paste may include a binder. Examples of the binder include styrene butadiene rubber (SBR) and modified products thereof, acrylonitrile butadiene rubber and modified products thereof, acrylic rubber and modified products thereof, fluororubber and the like. Among them, SBR is desirable.

The negative electrode paste may include a thickener. Examples of the thickener include cellulose-based polymers such as carboxymethylcellulose (CMC), methylcellulose (MC), cellulose acetate phthalate (CAP), hydroxypropylmethylcellulose (HPMC), and the like, and polyvinyl alcohol (PVA). Among them, CMC is desirable.

In the negative electrode paste, the ceramic particles are included in an amount of 3% by mass to 20% by mass based on the total solid content of the negative electrode paste. Where the amount of the ceramic particles is less than 3% by mass, the effect of improving the cycle characteristic obtained by including the ceramic particles cannot be sufficiently obtained. Meanwhile, when the amount of the ceramic particles exceeds 20% by mass, the total amount of the solvent (in particular, water) contained in the paste that is absorbed by the ceramic particles increases, and the paste viscosity increases. In addition, the peel strength of the negative electrode active material layer is lowered.

The negative electrode active material is desirably contained in an amount of more than 50% by mass, more desirably from 70% by mass to 96% by mass, and even more desirably from 75% by mass to 95% by mass, based on the total solid content of the negative electrode paste.

The binder is desirably contained in an amount of 0.1% by mass to 8% by mass, more desirably 0.2% by mass to 3% by mass, and even more desirably 0.3% by mass to 2% by mass, based on the total solid content of the negative electrode paste.

The thickener is desirably contained in an amount of 0.3% by mass to 3% by mass, and more desirably 0.4% by mass to 2% by mass, based on the total solid content of the negative electrode paste.

The solid content concentration of the negative electrode paste is desirably from 40% by mass to 80% by mass, and more desirably from 45% by mass to 60% by mass. When the solid content concentration is within the above range, the drying efficiency of the negative electrode paste can be improved. In addition, handling of the negative electrode paste is facilitated and uniform coating is facilitated, so that a negative electrode active material layer having a uniform thickness can be easily formed.

The preparation of the negative electrode paste can be carried out by mixing the negative electrode active material, the ceramic particles, the solvent, and optional components according to a known method.

Next, the prepared paste is coated onto the negative electrode current collector.

As the negative electrode current collector, a conductive member made of a metal having good electric conductivity (for example, copper, nickel, titanium, stainless steel, and the like) is desirably used as in the case of the conventional lithium ion secondary battery. Among the metals, copper is desirable. The shape of the negative electrode current collector is not particularly limited as it can be varied depending on the shape of the lithium ion secondary battery constructed using the obtained negative electrode, and may be in the form of rod, plate, sheet, foil, mesh, etc. Desirably, the negative electrode current collector is in the form of a sheet or a foil. The thickness of the negative electrode current collector is not particularly limited, but when a copper sheet or a copper foil is used as the negative electrode current collector, the thickness thereof is, for example, 6 μm to 30 μm.

Coating of the negative electrode paste on the negative electrode current collector can be carried out by a known method. For example, the negative electrode paste can be coated on the negative electrode current collector using a coating device such as a gravure coater, a comma coater, a slit coater, a die coater, and the like. The negative electrode active material layer may be formed on only one side of the negative electrode current collector, or may be formed on both sides, desirably on both sides. Therefore, the negative electrode paste is coated on one side or both sides of the negative electrode current collector, desirably on both sides.

Next, the drying step S102 will be described. The step S102 can be carried out according to a known method. For example, it can be carried out by removing the solvent from the negative electrode current collector coated with the negative electrode paste by using a drying apparatus such as a drying oven. The drying temperature and drying time may be appropriately determined according to the type of solvent to be used, and are not particularly limited. The drying temperature is, for example, more than 70° C. and 200° C. or less (typically 110° C. to 150° C.). The drying time is, for example, 10 sec to 240 sec (typically 30 sec to 180 sec).

Next, the pressing step S103 will be described. The step S103 can be carried out according to a known method. The pressing conditions may be appropriately set according to the desired thickness, weight per unit area, density, and the like of the negative electrode active material layer.

A negative electrode having the negative electrode active material layer formed on the negative electrode current collector can thus be obtained.

In the production method of the present embodiment, the coatability of the paste is satisfactory, and the peel strength of the negative electrode active material layer is also satisfactory. The reason for this is presumed as follows.

Figure 4A:
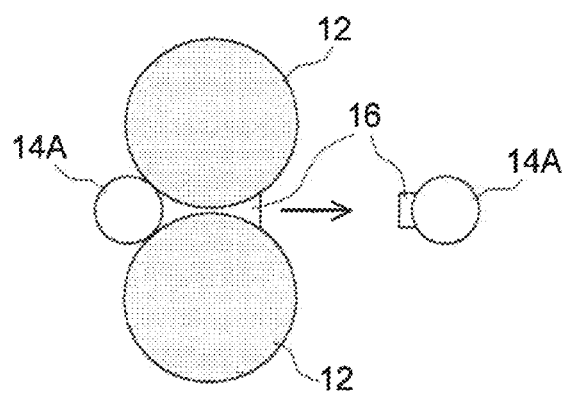
FIG. 4A is a diagram schematically showing an example using spherical ceramic particles having a large particle diameter.

FIG. 4A illustrates an example of using ceramic particles 14A having a spherical shape, that is, an aspect ratio of about 1, and a large particle diameter. The negative electrode active material particles 12 are joined together by a resin component (typically, a binder, a thickener, and the like) 16, and the ceramic particles 14A are joined thereto. In the case of using the spherical ceramic particles 14A having a large particle diameter, the spherical ceramic particles 14A having a large particle diameter move significantly when the pressing step S103 is carried out, and are detached together with the resin component 16 as shown by the arrow in FIG. 4A. As a result, at least one of peel strength and hardness of the negative electrode active material layer is lowered.

Figure 4B:
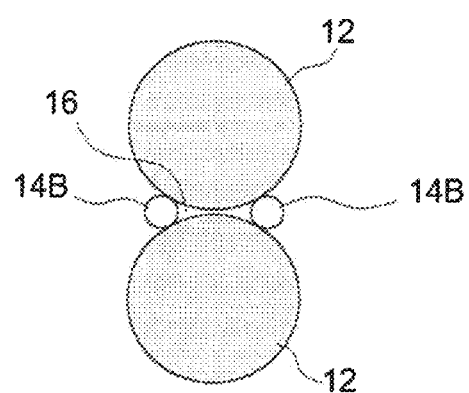
FIG. 4B is a diagram schematically showing an example using spherical ceramic particles having a small particle diameter.

FIG. 4B illustrates an example of using ceramic particles 14B having a spherical shape, that is, an aspect ratio of about 1, and a small particle diameter. The negative electrode active material particles 12 are joined together by a resin component (typically, a binder, a thickener, and the like) 16, and the ceramic particles 14B are joined thereto. In the case of using the spherical ceramic particles 14B having a small particle diameter, even when the pressing step S103 is carried out, the movement of the spherical ceramic particles 14B having a small particle diameter is small, and the ceramic particles 14B remain in a joined state. Therefore, the peel strength and the hardness of the negative electrode active material layer do not decrease. However, since the spherical ceramic particles 14B have a small particle diameter, they have a large specific surface area. Therefore, the solvent contained in the negative electrode paste is easily absorbed, the viscosity of the negative electrode paste is increased, and the coatability is deteriorated.

Figure 4C:
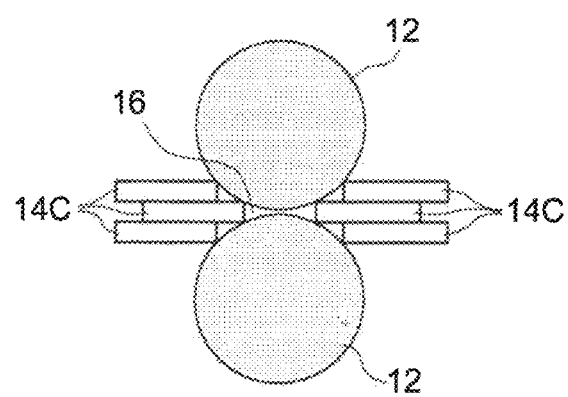
FIG. 4C is a diagram schematically showing an example of the present embodiment.

FIG. 4C illustrates an example of using ceramic particles 14C having an aspect ratio of 1.5 or more and 20 or less and a short side length of ⅕ or less of the average particle diameter of the negative electrode active material particles 12 in accordance with the present embodiment. Since the ceramic particle 14C has a small short side length, the movement of the ceramic particle 14C is small even when the pressing step S103 is carried out, as in the case of using the ceramic particles 14B having a small particle diameter. Therefore, the ceramic particles 14C remain in the joined state, and the peel strength and hardness of the negative electrode active material layer do not decrease. Rather, since the aspect ratio is in the range of 1.5 or more and 20 or less, the plurality of ceramic particles 14C enters between the negative electrode active material particles 12, as in the illustrated example, and the volume of filled gaps between the negative electrode active material particles 12 is increased. As a result, the peel strength and hardness of the negative electrode active material layer are improved. When the ceramic particles 14C have a plate shape having corners, the corners of the ceramic particles 14C are likely to bite into the negative electrode active material. Therefore, even when the ceramic particles 14C are subjected to stress when the pressing treatment is carried out in the pressing step S103, since the corners of the ceramic particles 14C contacting the negative electrode active material particles 12 function as hooks, the ceramic particles are unlikely to be moved. Further, since the aspect ratio is in the range of 1.5 or more to 20 or less, the specific surface area is small as compared with spherical particles. Therefore, the increase in the viscosity of the negative electrode paste is small and the coatability is not adversely affected.

With the method for producing a negative electrode according to this embodiment, satisfactory paste coatability is obtained without excessively increasing the viscosity of the negative electrode paste. In addition, it is possible to increase the peel strength and the hardness (for example, spring constant) of the negative electrode active material layer. Thus, the method for producing a negative electrode according to this embodiment, it is possible to produce a negative electrode with satisfactory coatability of the paste and high peel strength and hardness of the negative electrode active material layer with high productivity.

The negative electrode obtained by the production method according to the present embodiment can be advantageously used as a negative electrode for a secondary battery.

Therefore, from another aspect, the method for producing a secondary battery disclosed herein includes a step of preparing a negative electrode (negative electrode preparation step) by the production method according to the above-mentioned embodiment; a step of preparing an electrode assembly (electrode assembly preparation step) by laminating the obtained negative electrode with a positive electrode and a separator; and a step of preparing a secondary battery (secondary battery preparation step) by using the obtained electrode assembly.

The negative electrode preparation step can be implemented by carrying out the method for producing a negative electrode according to the above-described embodiment. The electrode assembly preparation step and the secondary battery preparation step can be carried out according to known methods. With such a method for producing a secondary battery, since the paste coatability of the negative electrode is satisfactory and the peel strength and the hardness of the negative electrode active material layer are high, it is possible to prepare a secondary battery with good material yield. Further, when a separator having a spring constant lower than the spring constant of the negative electrode is used in the electrode assembly preparation step, the increase in resistance of the obtained secondary battery at the time of repeated high-rate charging and discharging is significantly suppressed.

Therefore, from yet another aspect, the secondary battery disclosed herein includes an electrode assembly in which a positive electrode and a negative electrode are laminated with a separator being interposed therebetween, and a nonaqueous electrolyte. The negative electrode includes a negative electrode active material layer. The negative electrode active material layer includes a negative electrode active material and ceramic particles. The ceramic particles have an aspect ratio of 1.5 or more and 20 or less. The ceramic particles have a short side length of ⅕ or less of the average particle diameter of the negative electrode active material. The ceramic particles are contained in an amount of 3% by mass to 20% by mass in the negative electrode active material layer.

The secondary battery disclosed herein can be produced with a satisfactory material yield.

The configurations of the secondary battery produced by the method for producing a secondary battery disclosed herein and the secondary battery disclosed herein will be explained hereinbelow by considering a lithium ion secondary battery by way of example with reference to FIGS. 2 and 3.

Figure 2:
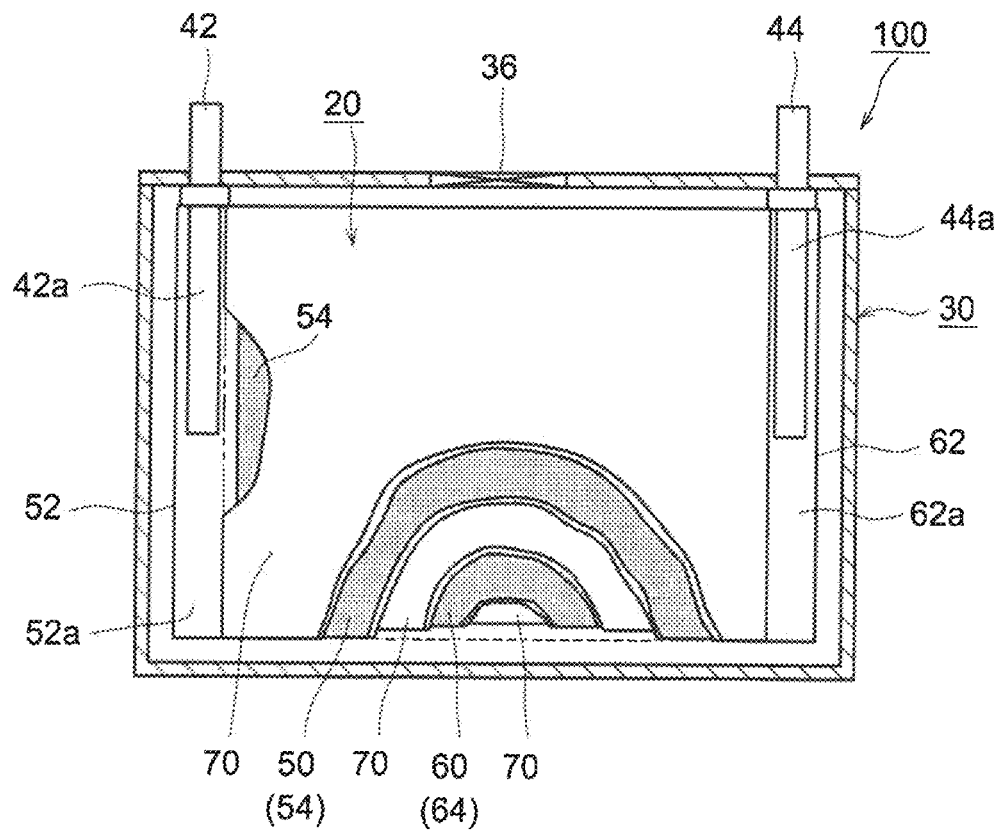
FIG. 2 is a cross-sectional view schematically showing the internal structure of a lithium ion secondary battery using a negative electrode obtained by a production method according to an embodiment of the present teaching.

A lithium ion secondary battery 100 shown in FIG. 2 is a sealed lithium ion secondary battery 100 constructed by accommodating a flat shaped wound electrode assembly 20 and a nonaqueous electrolytic solution (not shown in the figure) in a flat angular battery case (that is, an outer case) 30. The battery case 30 is provided with a positive electrode terminal 42 and a negative electrode terminal 44 for external connection and a thin safety valve 36 set so as to release the internal pressure when the internal pressure of the battery case 30 rises to a predetermined level or higher. The battery case 30 is also provided with an injection port (not shown in the figure) for injecting the nonaqueous electrolytic solution. The positive electrode terminal 42 is electrically connected to a positive electrode current collecting plate 42a. The negative electrode terminal 44 is electrically connected to a negative electrode current collecting plate 44a. For example, a lightweight metal material having good thermal conductivity such as aluminum is used as a material of the battery case 30.

Figure 3:
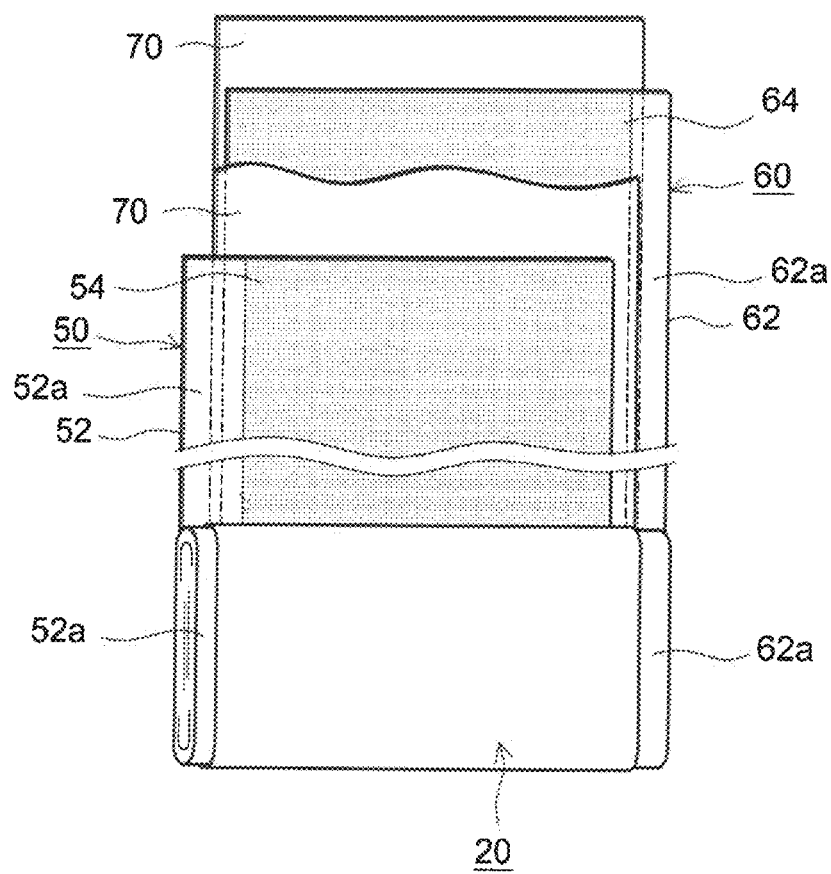
FIG. 3 is a schematic diagram showing the configuration of a wound electrode assembly of a lithium ion secondary battery using a negative electrode obtained by a production method according to an embodiment of the present teaching.

As shown in FIGS. 2 and 3, the wound electrode assembly 20 is of a form obtained by laminating a positive electrode sheet 50 in which a positive electrode active material layer 54 has been formed along the longitudinal direction on one side or both sides (here, both sides) of an elongated positive electrode current collector 52 and a negative electrode sheet 60 in which a negative electrode active material layer 64 has been formed along the longitudinal direction on one side or both sides (here, both sides) of an elongated negative electrode current collector 62, with two elongated separator sheets 70 being interposed therebetween, and winding the laminate in the longitudinal direction. The positive electrode current collector plate 42a and the negative electrode current collector plate 44a are connected to, respectively, a positive electrode active material layer-free region 52a (that is, a region where the positive electrode active material layer 54 is not formed and the positive electrode current collector 52 is thereby exposed) and a negative electrode active material layer-free region 62a (that is, a region where the negative electrode active material layer 64 is not formed and the negative electrode current collector 62 is thereby exposed), which are formed so as to protrude outward from both ends of the wound electrode assembly 20 in the winding axis direction (which is a sheet width direction orthogonal to the longitudinal direction) of the wound electrode assembly 20.

The positive electrode current collector 52 constituting the positive electrode sheet 50 can be exemplified by an aluminum foil. Examples of the positive electrode active material contained in the positive electrode active material layer 54 include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium transition metal phosphates (for example, $LiFePO_4$, and the like). The positive electrode active material layer 54 may include components other than the active material, for example, a conductive material, a binder, and the like. As the conductive material, for example, carbon black such as acetylene black (AB) or other carbon materials (for example, graphite and the like) can be advantageously used. As the binder, for example, polyvinylidene fluoride (PVdF) and the like can be used.

The negative electrode obtained by the production method according to the above-described embodiment is used for the negative electrode sheet 60. Therefore, the negative electrode active material layer 64 includes the negative electrode active material and ceramic particles. The aspect ratio of the ceramic particles is 1.5 or more and 20 or less. The short side length of the ceramic particles is ⅕ or less of the average particle diameter of the negative electrode active material. The ceramic particles are contained in an amount of 3% by mass to 20% by mass in the negative electrode active material layer 64.

The separator 70 can be exemplified by a porous sheet (film) made of a resin such as polyethylene (PE), polypropylene (PP), a polyester, cellulose, a polyamide and the like. Such a porous sheet may have a monolayer structure or a laminate structure of two or more layers (for example, a three layer structure in which a PP layer is laminated on both surfaces of a PE layer). A heat-resistant layer (HRL) may be provided on the surface of the separator 70.

Here, since the negative electrode sheet 60 is produced by the production method according to the above-described embodiment, the spring constant (that is, hardness) of the negative electrode active material layer 64 is increased.

Accordingly, it is desirable that the spring constant of the negative electrode sheet 60 be higher than the spring constant of the separator 70.

When the spring constant of the separator 70 is higher than the spring constant of the negative electrode sheet 60 (that is, when the separator 70 is harder than the negative electrode sheet 60), the volume of the negative electrode active material changes during charging and discharging, practically without any increase in the volume of the negative electrode active material layer 64. Therefore, when the negative electrode active material expands, the nonaqueous electrolyte is likely to flow out excessively from the negative electrode active material layer 64. However, when the spring constant of the negative electrode sheet 60 is higher than the spring constant of the separator 70, the volume of the negative electrode active material layer 64 can also change with the volume change of the negative electrode active material during charging and discharging. Therefore, the excessive outflow of the nonaqueous electrolyte from the negative electrode active material layer 64 can be suppressed during repeated charging and discharging. Therefore, excessive outflow of the nonaqueous electrolyte from the wound electrode assembly 20 can be suppressed. As a result, the increase in resistance of the lithium ion secondary battery 100 during repeated high-rate charging and discharging can be suppressed.

The higher the spring constant of the negative electrode sheet 60, the better, and the value thereof is desirably 210 kN/mm or more, more desirably 220 kN/mm or more and 300 kN/mm or less, and even more desirably 234 kN/mm or more and 261 kN/mm or less.

The spring constant of the separator 70 is, for example, 90 kN/mm or more and 200 kN/mm or less, and desirably 120 kN/mm or more and 190 kN/mm or less.

The spring constant of each of the negative electrode sheet 60 and the separator 70 can be determined, for example, by laminating 50 sheets cut out into 5 cm×5 cm squares to prepare a measurement sample, sandwiching the measurement sample with SUS plates, then applying a load with an autograph precision universal testing machine, and finding "spring constant=Δ(load)/Δ(thickness displacement)".

The same nonaqueous electrolyte can be used as that used in the conventional lithium ion secondary battery, and typically, an organic solvent (nonaqueous solvent) including a supporting salt can be used. Organic solvents such as various carbonates, ethers, esters, nitriles, sulfones, lactones and the like used in the electrolytic solutions of general lithium ion secondary batteries can be used as the nonaqueous solvent without particular limitation. Specific examples thereof include ethylene carbonate (EC), propylene carbonate (PC), diethyl carbonate (DEC), dimethyl carbonate (DMC), ethyl methyl carbonate (EMC), and the like. Such nonaqueous solvents can be used singly or in appropriate combinations of two or more thereof. As the supporting salt, for example, lithium salts such as $LiPF_6$, $LiBF_4$, $LiClO_4$ and the like can be suitably used. The concentration of the supporting salt is desirably 0.7 mol/L or more and 1.3 mol/L or less.

The nonaqueous electrolytic solution may include various additives, for example, a gas generating agent, a film forming agent, a dispersant, a thickening agent, and the like.

The lithium ion secondary battery 100 configured as described above can be used for various applications. Suitable applications include a drive power supply mounted on a vehicle such as an electric vehicle (EV), a hybrid vehicle (HV), a plug-in hybrid vehicle (PHV), and the like.

The angular lithium ion secondary battery 100 including the flat wound electrode assembly 20 has been described hereinabove as an example. However, the secondary battery produced by the method for producing a secondary battery disclosed herein and the secondary battery disclosed herein are not limited to the abovementioned example and may be lithium ion secondary batteries of other types. For example, these secondary batteries may be lithium ion secondary batteries including stacked electrode bodies, cylindrical lithium ion secondary batteries, laminate-type lithium ion secondary batteries, and the like. Further, these secondary batteries can be configured, according to known methods, as secondary batteries other than the lithium ion secondary batteries.

Examples relating to the present teaching will be described hereinbelow, but the present teaching is not intended to be limited to the configurations shown in the examples.

Preparation of Negative Electrodes A1 to A9 and Negative Electrodes B1 to B11

A negative electrode paste (solid content concentration: 50% by mass) was prepared by loading graphite having an average particle diameter of 10 μm as a negative electrode active material, ceramic particles, SBR as a binder, and CMC as a thickener into a kneader to obtain the mass ratio of these materials such that (the sum of graphite and ceramic particles):SBR:CMC=98:1:1, and kneading the materials while adjusting the viscosity with water. Table 1 shows the kinds, amount, long side length, short side length, and aspect ratio of the ceramic particles used. The long side length and the short side length are values measured by SEM observation. This negative electrode paste was coated on both sides of an elongated copper foil (negative electrode current collector) having a thickness of 10 μm at a width of 105 mm, dried, and pressed to a predetermined thickness, thereby preparing a negative electrode sheet having a negative electrode active material layer on both surfaces of the negative electrode current collector.

Evaluation of Coatability

The viscosity of the negative electrode paste was measured using a B type viscometer at a revolution speed of 20 rpm. In addition, the negative electrode active material layer of the produced negative electrode was visually observed to examine the state of occurrence of voids and evaluated according to the following criteria. The voids are caused by so-called foaming bubbles (a state where bubbles remain in the paste after coating).

G (good): There is no void in the negative electrode active material layer. Alternatively, the voids are small, and the negative electrode current collector cannot be seen through the void-formed portion of the negative electrode active material layer.

P (poor): There is a large void in the negative electrode active material layer, and the negative electrode current collector can be seen (including the case when the current collector can be seen through the void-formed portion of the negative electrode active material layer).

Evaluation of Strength

Peel Strength

The prepared negative electrode was cut into a strip shape having a width of 10 mm, and the negative electrode active material layer was attached to a base for a peel strength test. The negative electrode current collector was pulled with an autograph precision universal testing machine, a load was applied, and a peel strength was measured.

Measurement of Spring Constant

The prepared negative electrode was cut into fifty 5 cm×5 cm squares which were then laminated to prepare a measurement sample. The sample was sandwiched with SUS plates, and a load was applied with an autograph precision universal testing machine. The spring constant was calculated as "spring constant=Δ(load)/Δ(thickness displacement)".

The spring constant of the separator was also calculated in the same manner.

Preparation of Lithium Ion Secondary Battery for Evaluation

A lithium ion secondary battery for evaluation was prepared using the prepared negative electrode.

Specifically, a positive electrode paste (solid content concentration: 50% by mass) was prepared by loading $LiNi_{1/3}Mn_{1/3}Co_{1/3}O_2$ (LNCM) having an average particle diameter of 5 μm as a positive electrode active material, acetylene black (AB) as a conductive material, and polyvinylidene fluoride (PVdF) as a binder into a kneader to obtain the mass ratio of these materials such that LNCM:AB:PVdF=92:5:3, and kneading the materials while adjusting the viscosity with N-methyl-2-pyrrolidone (NMP). This positive electrode paste was coated on both sides of an elongated aluminum foil (positive electrode current collector) having a thickness of 15 μm at a width of 100 mm, dried, and pressed to a predetermined thickness, thereby preparing a positive electrode sheet having a positive electrode active material layer on both surfaces of the positive electrode collector.

The prepared positive electrode sheet and negative electrode sheet were laminated together with a separator sheet (a porous sheet having a PP/PE/PP three-layer structure; spring constant=160 kN/mm) having a thickness of 24 μm, and the laminate was wound and then pressed from the side direction to be flattened, thereby producing flat wound electrode assembly. Next, a positive electrode terminal and a negative electrode terminal connected to a case lid were welded to the wound electrode assembly, and the electrode assembly was inserted into an angular battery case main body having an injection hole. The case lid and the battery case main body were then sealed by welding.

Then, the nonaqueous electrolytic solution was injected from the injection hole of the battery case, and the sealing screw was tightened to the liquid injection hole to seal air-tightly the injection hole. The nonaqueous electrolytic solution was prepared by dissolving $LiPF_6$ as a supporting salt at a concentration of 1.0 mol/L in a mixed solvent including ethylene carbonate (EC), dimethyl carbonate (DMC), and ethyl methyl carbonate (EMC) at a volume ratio of EC:DMC:EMC=1:1:1. The side of the battery case was restrained by a SUS plate under a load of 500 kgf to obtain a lithium ion secondary battery for evaluation (designed battery capacity: 5 Ah).

Measurement of Battery Resistance

The prepared lithium ion secondary battery was adjusted to a SOC 60% charged state and then placed in an ambient atmosphere at 25° C. Discharge was carried out for 10 sec at a current value of 20C, and a voltage value was measured 10 sec after the start of discharge to calculate battery resistance. This was taken as the initial battery resistance.

High-Rate Charging Cycle Test

The lithium ion secondary battery for which the battery resistance was measured was adjusted to a SOC 60% charged state and then placed in an ambient atmosphere at 25° C. Then, 2000 cycles of charging and discharging were carried out, each cycle including constant-current charging at 30C for 10 sec, pause for 10 sec, constant-current discharging for 300 sec at 1C, and pause for 10 sec. The battery resistance after 2000 cycles was determined by the same method as described above. The resistance increase rate (%) was calculated from [(battery resistance after 2000 cycles)/(initial battery resistance)]×100.

TABLE 1

| Negative electrode | Negative electrode active material Average particle diameter (μm) | Ceramic particles | | | | | Coatability evaluation Paste viscosity (Pa · s) | Void evaluation | Strength evaluation | | Battery evaluation Resistance increase rate (%) |
|---|---|---|---|---|---|---|---|---|---|---|---|
| | | Kind | Amount (% by mass) | Long side length Da (μm) | Short side length Db (μm) | Aspect ratio Da/Db | | | Peel strength (N/m) | Spring constant (kN/mm) | |
| B1 | 10 | None | 0 | — | — | — | 2.1 | G | 5.2 | 152 | 182 |
| B2 | 10 | Alumina | 10 | 1 | 1 | 1 | 30.4 | P | 3.4 | 202 | 137 |
| B3 | 10 | Alumina | 10 | 2 | 2 | 1 | 12.2 | P | 0.4 | 190 | 146 |
| B4 | 10 | Alumina | 10 | 1.5 | 1.5 | 1 | 21.6 | P | 1.5 | 196 | 141 |
| A1 | 10 | Alumina | 10 | 1.5 | 0.5 | 3 | 4.6 | G | 3.5 | 239 | 116 |
| A2 | 10 | Alumina | 10 | 1.5 | 1 | 1.5 | 5.3 | G | 3.8 | 250 | 111 |
| A3 | 10 | Alumina | 10 | 2 | 0.1 | 20 | 3.2 | G | 3.4 | 241 | 115 |
| B5 | 10 | Alumina | 10 | 1.5 | 1.2 | 1.25 | 13.3 | P | 3.2 | 251 | 110 |
| B6 | 10 | Alumina | 10 | 1.5 | 0.05 | 30 | 2.4 | G | 1.4 | 180 | 154 |
| A4 | 10 | Alumina | 3 | 1.5 | 0.5 | 3 | 2.5 | G | 3.9 | 237 | 117 |
| A5 | 10 | Alumina | 20 | 1.5 | 0.5 | 3 | 7.6 | G | 2.9 | 261 | 106 |
| B7 | 10 | Alumina | 2 | 1.5 | 0.5 | 3 | 2.2 | G | 4.3 | 179 | 155 |
| B8 | 10 | Alumina | 25 | 1.5 | 0.5 | 3 | 15.4 | P | 1.6 | 250 | 111 |
| A6 | 10 | Alumina | 10 | 0.5 | 0.17 | 3 | 6.5 | G | 3.9 | 252 | 110 |
| A7 | 10 | Alumina | 10 | 6 | 2 | 3 | 3.3 | G | 2.8 | 234 | 118 |
| A8 | 10 | Boehmite | 10 | 1.5 | 0.5 | 3 | 5.3 | G | 2.9 | 238 | 116 |
| A9 | 10 | Aluminum hydroxide | 10 | 1.5 | 0.5 | 3 | 6.1 | G | 2.8 | 235 | 118 |
| B9 | 10 | Boehmite | 10 | 1 | 1 | 1 | 32.3 | P | 3.5 | 199 | 139 |
| B10 | 10 | Aluminum hydroxide | 10 | 1 | 1 | 1 | 33.9 | P | 3.3 | 199 | 147 |
| B11 | 10 | Alumina | 10 | 2.5 | 2.5 | 1 | 6.6 | P | 4.5 | 155 | 178 |

Table 1 demonstrates that the negative electrodes A1 to A7 are excellent in all of paste coatability and peel strength and hardness of the negative electrode active material layer. Further, it is understood that the batteries using the negative electrodes A1 to A7 have a low resistance increase rate after the high-rate charging cycle test, and excellent cycle characteristic.

Meanwhile, since the ceramic particles are not added to the negative electrode B1, the spring constant is low (that is, the hardness of the negative electrode active material layer is low). As a result, in the battery using the negative electrode B1, the resistance increase rate has increased after the high-rate charging cycle test.

In the negative electrode B2 using a spherical (aspect ratio of 1) ceramic (alumina) powder having a particle diameter of 1 μm, the spring constant was higher and resistance increase rate after the high-rate charging cycle test of the battery including such negative electrode was lower than those in the negative electrode B1. However, the viscosity of the paste was greatly increased and the coatability was poor. This is apparently because the ceramic particles had a small diameter, the specific surface area of the ceramic particles increased, the amount of water absorbed by the ceramic particles increased, and the paste viscosity increased.

In the negative electrode B3 using spherical ceramic particles having a particle diameter of 2 μm, the spring constant was higher and the resistance increase rate after the high-rate charging cycle test of the battery including such negative electrode was lower than those in the negative electrode B1, but a decrease in the peel strength was observed. This is apparently because the ceramic particles moved significantly due to impacts caused by pressing when pressed at the time of preparation of the negative electrode, and this movement resulted in the detachment of the ceramic particles along with CMC or SBR from the state in which graphite and the ceramic particles were bonded with CMC or SBR, and in the decrease in the strength of the negative electrode active material layer.

The negative electrode B4 used spherical ceramic particles having a particle diameter intermediate between those of the spherical ceramic particles used in the negative electrode B2 and the negative electrode B3, but both the increase in paste viscosity and the decrease in peel strength were conspicuous.

In the negative electrode B5, the aspect ratio of the ceramic particles was set to 1.25, but the paste viscosity was high and the coatability was poor. This was apparently because even when the aspect ratio was 1.25, since the specific surface area of the ceramic particles was sufficiently large, the amount of water absorbed by the ceramic particles was large and the paste viscosity increased.

In the negative electrode B6, the aspect ratio of the ceramic particles was set to 30, but the peel strength was low. In addition, the spring constant was low, and the resistance increase rate after the high-rate charging cycle test of the battery including such negative electrode was high. This was apparently because the volume of the portion of the ceramic particles between the negative electrode active material particles which made no contribution to the increase in spring constant was increased.

In the negative electrode B7, the amount of the ceramic particles was set to 2% by mass, but the spring constant was low, and the resistance increase rate after the high-rate charging cycle test of the battery including such negative electrode was high. This was apparently because the amount of the ceramic particles was too small and the adverse effect caused by the portion in the negative electrode active material layer in which the spring constant was not increased was significant.

In the negative electrode B8, the amount of the ceramic particles was set to 25% by mass, but the paste coatability was poor. This was apparently because the total amount of the ceramic particles was too large and the amount of water absorbed by the ceramic particles increased. The peel strength was also low, which was probably due to the increase in the amount of the ceramic particles not bonded by CMC or SBR.

In the negative electrodes A8 and B9 and the negative electrodes A9 and B10, the material of the ceramic particles was changed to boehmite and aluminum hydroxide, but the same tendency was observed, and in the negative electrodes A8 and A9, all of the paste coatability and the peel strength and hardness of the negative electrode active material layer were excellent, and the battery provided with the negative electrode had excellent cycle characteristic.

In the negative electrode B11, the short side length of the ceramic particles was made larger than ⅕ of the average particle diameter of the negative electrode active material, but the spring constant was low and the resistance increase rate after the high-rate charging cycle test was high. This was apparently because the short side length of the ceramic particles was too large which resulted in the detachment of the ceramic particles along with CMC or SBR from the state in which graphite and the ceramic particles were bonded with CMC or SBR, and in the decrease in hardness of the negative electrode active material layer.

It follows from the above-described results that with the method for producing a negative electrode according to the present embodiment, the paste coatability is improved and the peel strength and hardness of the negative electrode active material layer are also improved. It is also understood that when the negative electrode obtained by the production method according to the present embodiment is used together with a separator having a low spring constant in a secondary battery (particularly, a lithium ion secondary battery), an excellent cycle characteristic (particularly, a high-rate cycle characteristic) is obtained.

Although specific examples of the present teaching have been described in detail hereinabove, these examples are merely illustrative and do not limit the scope of the claims. The features set forth in the claims include those obtained by variously modifying and changing the specific examples.

What is claimed is:

1. A method for producing a negative electrode of a lithium ion secondary battery, the method comprising:
    coating a negative electrode paste including (i) a negative electrode active material and (ii) ceramic particles that are different from the negative electrode active material on a negative electrode current collector;
    drying the coated negative electrode paste to form a negative electrode active material layer; and
    pressing the negative electrode active material layer,
    wherein the ceramic particles have a plate shape having corners and an aspect ratio of 1.5 or more and 20 or less,
    the ceramic particles have a short side length of ⅕ or less of an average particle diameter of the negative electrode active material, the short side length being a thickness of the plate-shaped ceramic particles, and
    in the negative electrode paste, the ceramic particles are contained in an amount of 3% by mass to 20% by mass based on a total solid content of the negative electrode paste.

2. A method for producing a lithium ion secondary battery, the method comprising:
    preparing a negative electrode by the method for producing a negative electrode according to claim 1;
    laminating the obtained negative electrode together with a positive electrode and a separator to prepare an electrode assembly; and
    preparing a secondary battery by using the obtained electrode assembly.

3. A lithium ion secondary battery comprising:
    an electrode assembly in which a positive electrode and a negative electrode are laminated with a separator being interposed therebetween; and
    a nonaqueous electrolyte,
    wherein the negative electrode includes a negative electrode active material layer,
    the negative electrode active material layer includes a negative electrode active material and ceramic particles,
    the ceramic particles have a plate shape having corners and an aspect ratio of 1.5 or more and 20 or less, the ceramic particles have a short side length of ⅕ or less of an average particle diameter of the negative electrode active material, the short side length being a thickness of the plate-shaped ceramic particles, the ceramic particles are contained in an amount of 3% by mass to 20% by mass in the negative electrode active material layer, and the ceramic particles are different from the negative electrode active material.

4. The secondary battery according to claim 3, wherein a spring constant of the negative electrode is higher than a spring constant of the separator.

5. The secondary battery according to claim 4, wherein the ceramic particles have a plate shape having corners.

6. The method according to claim 1, wherein the ceramic particles do not participate in a charge-discharge reaction of the lithium ion secondary battery.

7. The secondary battery according to claim 3, wherein the ceramic particles do not participate in a charge-discharge reaction of the lithium ion secondary battery.

8. The method according to claim 1, wherein the negative electrode active material is a carbon material.

9. The secondary battery according to claim 3, wherein the negative electrode active material is a carbon material.

10. The method according to claim 1, wherein an average particle diameter of the negative electrode active material is in a range of 5 μm to 15 μm.

11. The secondary battery according to claim 3, wherein an average particle diameter of the negative electrode active material is in a range of 5 μm to 15 μm.

* * * * *